No. 771,561. PATENTED OCT. 4, 1904.
C. A. MEURELL.
BREAD FORMING MACHINE.
APPLICATION FILED MAY 5, 1904.
NO MODEL.

No. 771,561.

Patented October 4, 1904.

UNITED STATES PATENT OFFICE.

CARL AUGUST MEURELL, OF SÄTER, SWEDEN.

BREAD-FORMING MACHINE.

SPECIFICATION forming part of Letters Patent No. 771,561, dated October 4, 1904.

Application filed May 5, 1904. Serial No. 206,505. (No model.)

*To all whom it may concern:*

Be it known that I, CARL AUGUST MEURELL, a subject of the King of Sweden and Norway, residing at Säter, Sweden, (whose post-office address is Säter, Sweden,) have invented certain new and useful Improvements in Bread-Forming Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has relation to a machine designed for use in the manufacture of bread, and more particularly to the manufacture of what is known as "Swedish health bread," which is made in the form of thin cakes, the dough being spread out in a thin layer upon a flour-dusted support and then dusted over with flour, pricked, cut into cakes, the excess of flour previously dusted or scattered thereon removed, and baked. In the manufacture of this particular kind of bread the proportions of water and flour or meal are of importance, as the greater the proportion of water within certain limits the crisper the bread. Hence the dough when made up is comparatively thin and very difficult to roll out into a thin cake of as nearly uniform thickness as possible, and this, as well as the other operations above referred to, has before my invention been effected by hand, involving a great deal of patient labor and time. The means for spreading the dough into a thin layer of as nearly a uniform thickness as possible, the means for pricking the layer of dough, and the means for slicing or cutting up said layer into cakes of suitable or desirable size for handling and packing, and even the means for removing the superfluous flour sprinkled on the layer of dough while being spread out, may be combined in one machine in bakeries where the output is sufficiently large to admit of the use of a table of sufficient dimensions to provide the necessary space for the application of the various appliances. Where the output is small, it will be preferable to use separate apparatuses for performing the functions above referred to.

This invention relates more particularly to mechanism for sectioning a sheet of dough formed on a rotatable table and then pricked by mechanisms described in applications for patents filed of even date with this.

Figure 1:
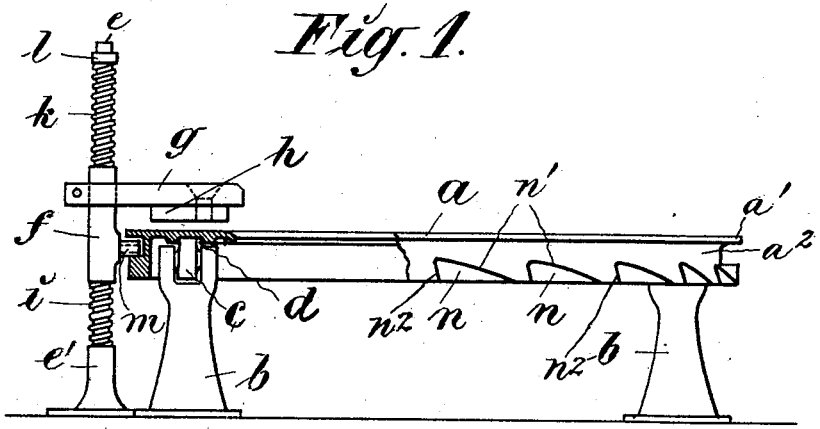
Figure 2:
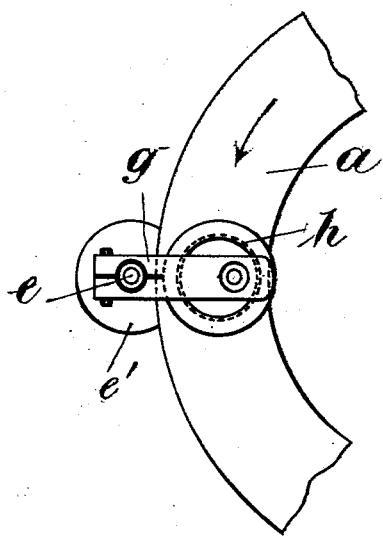

In the accompanying drawings, Figure 1 is an elevation, partly in section, of a machine embodying my invention; and Fig. 2 is a fragmentary top plan view thereof.

In the bifurcated upper ends of suitable standards $b$ are journaled friction-rollers $c$, by which a preferably annular table $a$ is supported, which table may be rotated by any suitable mechanical appliances or by hand. The table $a$ has an external vertical circular flange $a^2$ of smaller diameter than said table, whereby the latter forms a horizontal flange $a'$, that projects beyond the flange or rim $a^2$, which latter is provided with a series of cam projections $n$, having inclined faces $n'$ and vertical faces $n^2$. At one side of the table is arranged a standard $e$, preferably of circular form in cross-section and rising from a base $e'$ of greater diameter than said standard, and on said standard is loosely mounted a sleeve $f$ between two springs $i$ and $k$, also mounted on said standard. The sleeve $f$ has a pin on which is loosely mounted a roller $m$, which latter projects into the path of the aforementioned cam projections $n$. The sleeve $f$ has an arm $g$, that projects over the table $a$, to which arm is secured a circular knife $h$, the diameter of which is substantially equal to the width of the sheet of dough on the table and less than the width of said table between its inner and outer peripheries. When the table $a$ is rotated in the direction of arrow, Fig. 2, and the roller lies at the foot of the inclined face $n'$ of one of the cam projections, said roller will be caused to ride upwardly over said inclined face, thereby causing sleeve $f$ to move upwardly on standard $e$ against the stress of spring $k$, which is compressed, while spring $i$ is correspondingly expanded and tends to assist such upward movement of the sleeve, thus raising the knife $h$ sufficiently above the table to clear the sheet of dough thereon. As the inclined face $n'$ of a cam projection $n$ moves from under roller $m$ the sleeve $f$ is free to drop along the vertical face $n^2$ of such cam projection and under the stress of spring $k$ forces the knife $h$ through the sheet of dough on the table $a$ and severs it, the spring $i$ now serving as a buffer-spring. As shown, the upper end of spring $k$ abuts against a collar $l$, which latter is in practice adjustable on standard $e$ in any usual or well-known manner for the purpose of regulating the tension of said spring.

It will be observed that the spring $k$ may be dispensed with in view of the fact that the sleeve $f$ is positively moved upward on standard $e$, and said sleeve may in this case be made sufficiently heavy to overcome the tension of spring $i$ to a sufficient extent when said sleeve drops, as above stated, to cause the knife $h$ to cut through the sheet of dough.

In the drawings I have shown the knife or cutter $h$ as being of circular form; but this is not absolutely necessary, as it may be straight, to cut up the sheet of dough into segments.

Of course it will be understood that the length of the inclined or cam faces $n'$ of the cam projections will depend upon the diameter of the cutter when a circular cutter is used, and the diameter of said cutter will depend upon the width of the sheet of dough to be cut up. Similarly when a straight cutter is used the length thereof and the length of the inclined faces $n'$ of the cam projections $n$ will depend upon the width of the sheet of dough and the dimensions of the segments to be cut from said sheet, the table $a$ being rotated at a proper speed in either case.

Having thus described my invention, what I claim as new therein, and desire to secure by Letters Patent, is—

1. The combination with a moving table, of a spring-urged cutter and means on the table to control movement of the cutter, substantially as described.

2. The combination with a circular table, of cams on the periphery thereof, a vertically-movable cutter mounted above the table, said cutter operated by the cams, substantially as described.

3. The combination with an annular, horizontal, revoluble table, of a spring-actuated cutter extending nearly across said table, means controlled by the rotation of the table to periodically raise the cutter against the stress of its spring and then release said cutter, for the purposes set forth.

4. The combination with a horizontal, circular, rotatable table; of a cutter, mechanism connected to the table to move the cutter out of the path of a sheet of dough on said table, a spring to move the cutter into the path of and through said sheet of dough, said mechanism and spring operating alternately, and a cushioning device to cushion the downward movement of the cutter under the action of the aforesaid spring, substantially as and for the purposes set forth.

5. The combination with a horizontal, circular, rotatable table; a standard on one side thereof, a cutter-carrier mounted to slide on said standard, an actuating-spring operating to move the carrier downwardly on the standard, a buffer-spring antagonizing the stress of said actuating-spring and a cutter connected to the carrier and held above the table; of means connected to the table to move the cutter-carrier against the stress of its actuating-spring and then release said carrier, for the purpose set forth.

6. The combination with a horizontal, circular rotatable table, a standard on one side thereof, an actuating and a buffer spring on said standard, a cutter-carrier loosely mounted on the standard between said springs and a cutter connected to the carrier and held above the table; of means connected to said table to move the cutter-carrier on the standard against the stress of its actuating-spring and then release said carrier, substantially as and for the purposes set forth.

7. The combination with a horizontal, circular, rotatable table, provided with peripheral cam projections $n$ having cam-faces $n'$ and vertical faces $n^2$, of a vertically-movable cutter-carrier above the table, a pin carrying a roller and projecting from the carrier into the path of the aforesaid cam projections, which latter when the table is rotated move alternately into and out of engagement with the aforesaid roller to raise and then release the carrier, and a spring acting on the carrier when so released to move it down onto the table, substantially as and for the purposes set forth.

In testimony that I claim the foregoing as my invention I have signed my name in presence of two subscribing witnesses.

CARL AUGUST MEURELL.

Witnesses:
L. KALLENBERG,
HARRY FR. ALBIHN.